(12) United States Patent
Mowry et al.

(10) Patent No.: US 10,162,699 B2
(45) Date of Patent: Dec. 25, 2018

(54) ARTIFICIAL INTELLIGENCE FOR RESOLUTION AND NOTIFICATION OF A FAULT DETECTED BY INFORMATION TECHNOLOGY FAULT MONITORING

(71) Applicant: SECURE-24, LLC, Southfield, MI (US)

(72) Inventors: Eric Mowry, New Hudson, MI (US); Nick Ilitch, Detroit, MI (US); Matt Goodrich, Whitmore Lake, MI (US); Chase Putans, Troy, MI (US); Ryan Youngs, Trenton, MI (US)

(73) Assignee: SECURE-24, LLC, Southfield, MI (US)

( * ) Notice: Subject to any disclaimer, the term of this patent is extended or adjusted under 35 U.S.C. 154(b) by 204 days.

(21) Appl. No.: 15/395,568

(22) Filed: Dec. 30, 2016

(65) Prior Publication Data

US 2018/0189130 A1 Jul. 5, 2018

(51) Int. Cl.
*G06F 11/07* (2006.01)

(52) U.S. Cl.
CPC ........ *G06F 11/0793* (2013.01); *G06F 11/079* (2013.01); *G06F 11/0781* (2013.01)

(58) Field of Classification Search
CPC . G06F 11/0781; G06F 11/079; G06F 11/0793
See application file for complete search history.

(56) References Cited

U.S. PATENT DOCUMENTS

| | | | |
|---|---|---|---|
| 6,556,659 B1 | 4/2003 | Bowman-Amuah | |
| 6,983,225 B2* | 1/2006 | Sprogis | G06F 11/0748 702/188 |
| 7,904,756 B2* | 3/2011 | Dilman | G06F 11/0727 714/38.1 |
| 8,762,190 B1 | 6/2014 | Solomon et al. | |
| RE45,959 E | 3/2016 | McCord et al. | |
| 9,367,810 B1 | 6/2016 | Gagne et al. | |
| 9,467,970 B1 | 10/2016 | Kim et al. | |
| 2007/0198275 A1 | 8/2007 | Malden et al. | |
| 2009/0210283 A1* | 8/2009 | Miyamoto | G06F 11/0748 705/7.14 |
| 2013/0305357 A1 | 11/2013 | Ayyagari et al. | |

* cited by examiner

*Primary Examiner* — Joseph R Kudirka
(74) *Attorney, Agent, or Firm* — Howard & Howard Attorneys PLLC

(57) ABSTRACT

A resolution and notification server and computer-implemented techniques implemented on the same are disclosed for providing automated resolution and notification of a fault detected about a device monitored by an information technology (IT) fault monitoring server.

21 Claims, 5 Drawing Sheets

ARTIFICIAL INTELLIGENCE FOR RESOLUTION AND NOTIFICATION OF A FAULT DETECTED BY INFORMATION TECHNOLOGY FAULT MONITORING

TECHNICAL FIELD

Suggested Art Unit: 2129 (Data processing); Suggested Class 706 (Artificial Intelligence). The technical field relates generally to data processing and artificial intelligence related to automated resolution and notification of a fault detected about a device monitored by information technology (IT) fault monitoring.

BACKGROUND

Businesses are faced with delivering innovative business solutions with constrained budgets and limited resources. Every device in the enterprise IT landscape is vulnerable to a potential risk of error events both in steady state and more so during periods of change. These risks are due to many types of errors including security breaches, system failures, process faults and human error. As the amount of connected devices grows exponentially, many organizations lack adequate technical skills and resources to keep up with the growing IT landscape. Managed service IT providers are employed by businesses to manage, monitor, log, investigate and report on such events and provide visibility, response and remediation of critical incidents, vulnerabilities or breaches. Such services require extensive human resources to investigate and resolve the incidents. Support teams investigate incidents manually and often with isolated knowledge in attempt to resolve the issue at hand. Moreover, determining which support team is most suitable to address the incident is a manual process. Therefore, conventional methods of logistically managing and manually resolving IT incidents are inefficient from a cost and timing perspective.

Moreover, notifications often need to be delivered to both the proper support team as well as to contacts at the business regarding the incidents. Managing delivery of such notifications is not trivial. Service providers often have a complex infrastructure, support ecosystem and hierarchy of resources for resolving the issue. With the ever-increasing rate of incidents, complexity of such incidents, and the amount of businesses managed, notification delivery has become a burdensome and inefficient process. As such, there is a need in the art for systems and methods for addressing at least the aforementioned problems.

SUMMARY

Embodiments of a resolution and notification server, a computer-implemented method implemented on the resolution and notification server and a non-transitory storage medium comprising computer-executable instructions stored therein are disclosed for providing automated resolution and notification of a fault detected about a device monitored by an IT fault monitoring server. A recognition module is automated to receive fault data relating to the fault from the IT fault monitoring server and to analyze the fault data to select a contact group from among a selection of contact groups to contact about the fault. An arbiter module is automated to determine priority of the fault, validity of the fault data, and whether a planned maintenance window associated with the device is present. The arbiter module instructs auto-closure of the fault for monitoring purposes if the fault data is invalid or that the planned maintenance window is present and determines eligibility of the fault for assessment by an auto-resolution procedure if the fault data is valid and the planned maintenance window is not present. The arbiter module instructs generation of an electronic dynamic work instructions packet comprising instructions for resolution of the fault by an IT resolution group if the fault is ineligible for assessment by the auto-resolution procedure. An auto-resolution module is automated to execute the auto-resolution procedure if the arbiter module determines that the fault is eligible for assessment by the auto-resolution procedure. The auto-resolution procedure is automated to generate payload relating to the fault, transmit the payload to an automation platform to investigate the fault, and receive an auto-resolution status of the fault from the automation platform. The auto-resolution module instructs closure of the fault if the auto-resolution status from the automation platform indicates that the fault is auto-resolved and instructs generation of the electronic dynamic work instructions packet if the auto-resolution status from the automation platform indicates that the fault is non-auto-resolved.

The techniques described herein provide artificial intelligence for prompt and cost efficient resolution and notification of faults. The arbiter module and auto-resolution modules are automated to manage and auto-resolve faults thereby substantially reducing the number of faults needing manual resolution. Moreover, the recognition module is automated to efficiently determine which contact team or IT resolution group is most suitable to contact regarding the fault. Furthermore, automated closure diagnostic techniques are provided for continuously improving artificial intelligence capabilities for resolving faults by computing closure confidence scores and feeding back such intelligence back into the automated resolution processes in a closed-loop fashion. The techniques described herein dynamically recognize, filter, arbitrate, and predictively resolve faults in an automated fashion, thereby providing a significant improvement to managed service in the IT industry not previously achievable. The techniques described herein may exhibit advantages other than those described.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

I. IT System Overview

Figure 1:
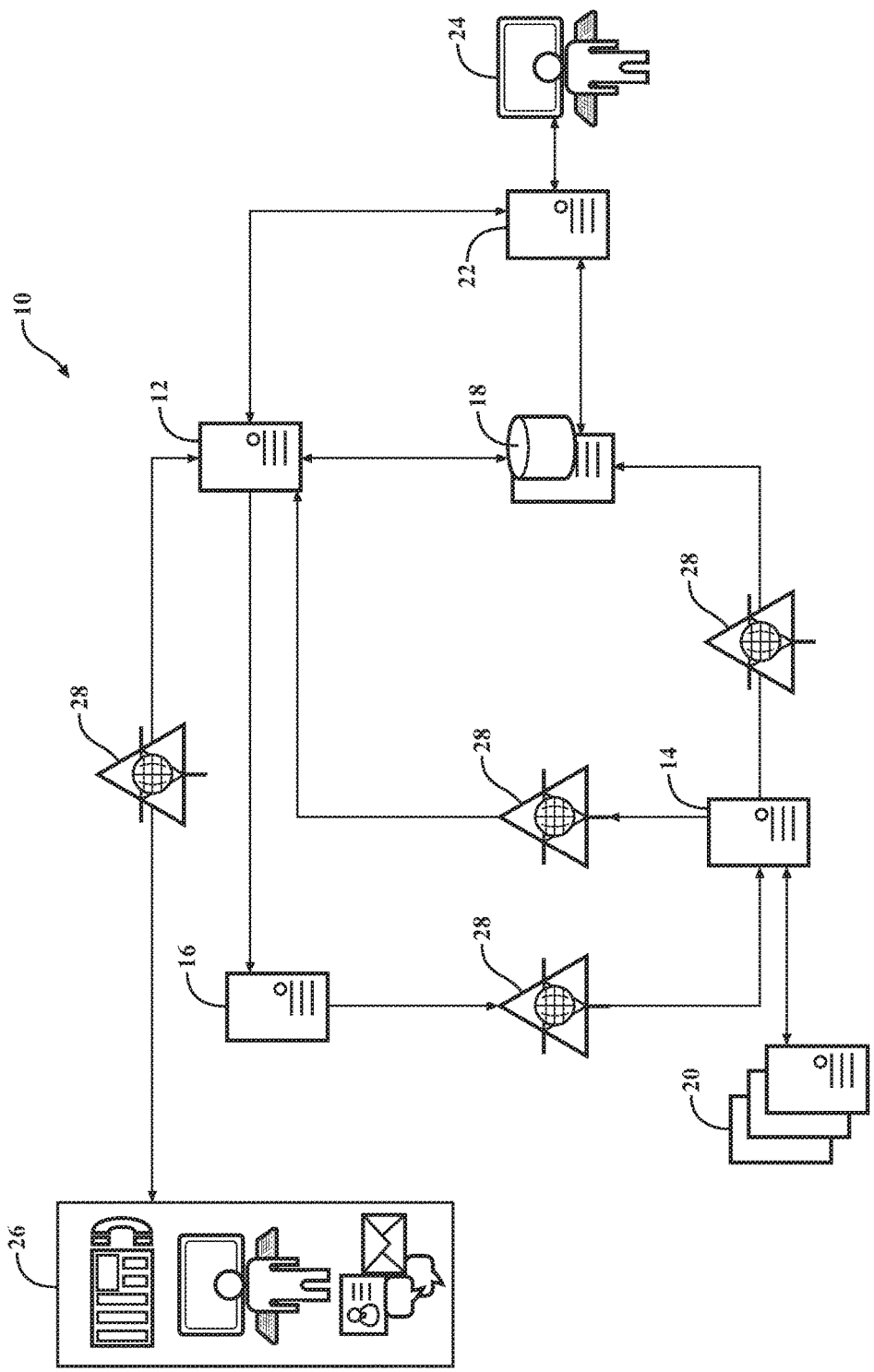
FIG. 1 is a diagram of one embodiment of an IT network or system according to one embodiment.

Referring to FIG. 1, an IT network or system 10 is provided. The IT system 10 comprises a plurality of devices or servers, including a resolution and notification server 12 (hereinafter RN server), an IT fault monitoring server 14, an automation platform 16 (e.g., server or module), and a central database and server 18.

The IT fault monitoring server 14 is configured to monitor a device 20 for detection of faults occurring for a monitored device 20. In one embodiment, the IT fault monitoring server 14 comprises a multiple backend system that may be administered by a third-party. The IT fault monitoring server 14 transmits data related to the detected faults to the RN server 12 the using any suitable form of electronic transmission.

The central database server 18 pulls data from the IT fault monitoring server 14 on a periodic basis, e.g., daily. As described below, this data is used to feed the RN server 12 such that the RN server 12 is enabled to make intelligent and automated decisions relating to resolution and notification. For example, the central database server 18 provides data related to the monitored device 20, fault data, and additional data created internally by the server 18 or entered by a user.

The monitored device 20 is any computer-related device (e.g., server, PC), system, network for which IT fault monitoring, resolution, and notification services of the IT system 10 are provided. Although the term "device" is utilized, the monitored device 20 may also include any application, topology, or environment embodied by a device or system. The monitored device 20 may be one or a plurality of monitored devices 20. The monitored device 20 is typically operated or managed by a managed service provider (MSP). As used herein, the MSP is an entity, enterprise, business, or individual for whom services of the IT system 10 are provided or managed. Examples of the MSP include but are not limited to, customers, IT resolution service providers (e.g., groups) who are internal individual and/or teams charged with resolving certain faults, other service providers, partners, or any third-party organization.

The RN server 12 is configured to provide automated resolution and notification (e.g., electronic ticket creation) for the detected fault. As used herein, the term "fault" is intended to describe any undesired computer-related occurrence, incident, event, and/or breach that affects the monitored device 20. Examples of faults include, but are not limited to computer hardware issues and faults (not limited to CPU, RAM, storage, network interfaces), data center infrastructure faults (not limited to power, cooling, physical, infrastructure chassis, server infrastructure, general physical redundancy faults), network faults (not limited to routers, switches, firewalls, load balancers, wireless, network utilization, network appliance faults), virtualization layer faults (not limited to virtual storage and physical storage faults), operating system faults, certificate and authentication faults, file systems and drive errors, utilization warning and faults, security faults (not limited to access control, audit, behavioral analysis, brute force attempts, virus, trojan and phishing, security incident event management detections, threat intelligence detections, firewall alerts), application level faults (application errors, session timeouts, service unavailable, application performance issues, synthetic transaction), and the like.

The servers and devices of the IT system 10 described herein may be interpretatively connected using any suitable means of communication, such as direct or wireless communication. In one embodiment, as shown in FIG. 1, application programming interfaces 28 (APIs) such as representational state transfer application programming interfaces (REST APIs) are utilized to provide a web service for enabling the servers to communicate via the Internet, LAN, and/or WAN. In one embodiment, JavaScript Object Notation (JSON) format is utilized by the REST APIs 28 to provide asynchronous communication. In one embodiment, the IT fault monitoring server 14 communicates with the automation platform 16, RN server 12, and central database server 18 by utilizing the APIs 26. Additionally, the RN server 12 may communicate with the notification server 26 using REST APIs 28. APIs other than REST APIs may be employed by the system 10.

A portal server 22 is provided for hosting an interface for contacts between an access device 24 and the central database server 18. The portal server 22 displays selected data from the central database server 18 such that, e.g., MSPs, may modify contact information (e.g., call tree data) and parameters defining when the MSP should be contacted on a per-check basis relating to faults. Through the portal server 22, MSPs may also schedule a maintenance mode defining a present or future maintenance window of time (i.e., planned downtime) for the monitored device 20 during which notification or resolution related to the fault should be suppressed. Through the portal server 22, the MSP may view maintenance mode parameters and update or view updates to electronic tickets that are generated through the RN server 12. As such, the portal server 22 provides multi-tenant customization. The central database server 18 may comprise a master list of all maintenance windows that have been pushed into the IT fault monitoring server 14.

In some embodiments, the portal server 22 may additionally provide the MSP with insight into performance trends related to monitored devices 20 and detailed support information and scale (e.g., add or remove) virtual resources like CPU, storage and RAM within their environments. The access device 24 may be any suitable device accessible by an entity or individual, such as a laptop computer, PC, mobile computing device, tablet, smartphone, or the like. Interface with the portal server 22 may be implemented using cloud computing techniques, or the like.

The RN server 12 is coupled to a notification server 26. The notification peripherals may include any suitable device or system for enabling transmission notifications, such as an email routing system, a telephonic routing system (e.g., a hosted, virtual or mobile PBX system), a chat hosting system, instant messaging system, a text routing system, short message service (SMS) system or the like. The notification server 26 is utilized to establish contact with one or more IT resolution groups 32 (FIG. 3C) who are internal individual and/or teams charged with resolving certain faults. The notification server 26 is also utilized to establish contact with multiple independent contact groups 34 (FIG. 3C) who have an interest in the fault. Such contacts groups may include, e.g., the MSP, other service providers, partners, or any third-party organization. Contact groups 34 other than those described herein may be specified.

Although the servers are shown as separate components in FIG. 1, some of these servers may be consolidated into a single server. For example, the RN server 12 may be combined with the automation platform 16 and/or the central database 12 in a single server. The IT system 10 may be designed or laid out in a fashion different than shown in FIG. 1 depending on server assignment, location, and functionality.

The servers may be any type of server depending on the functionality or purpose of the server. Such server types include, but are not limited to file servers, domain servers, database servers, application servers, and the like. Any of the servers or devices of the IT system 10 may comprise a non-transitory memory 36 for storing data and/or computer-executable instructions, such as software, modules, algorithms or the like. These instructions, when executed by one or more processors, are configured to implement the techniques described below.

II. Techniques for Providing Automated Fault Resolution and Notification

Figure 2:
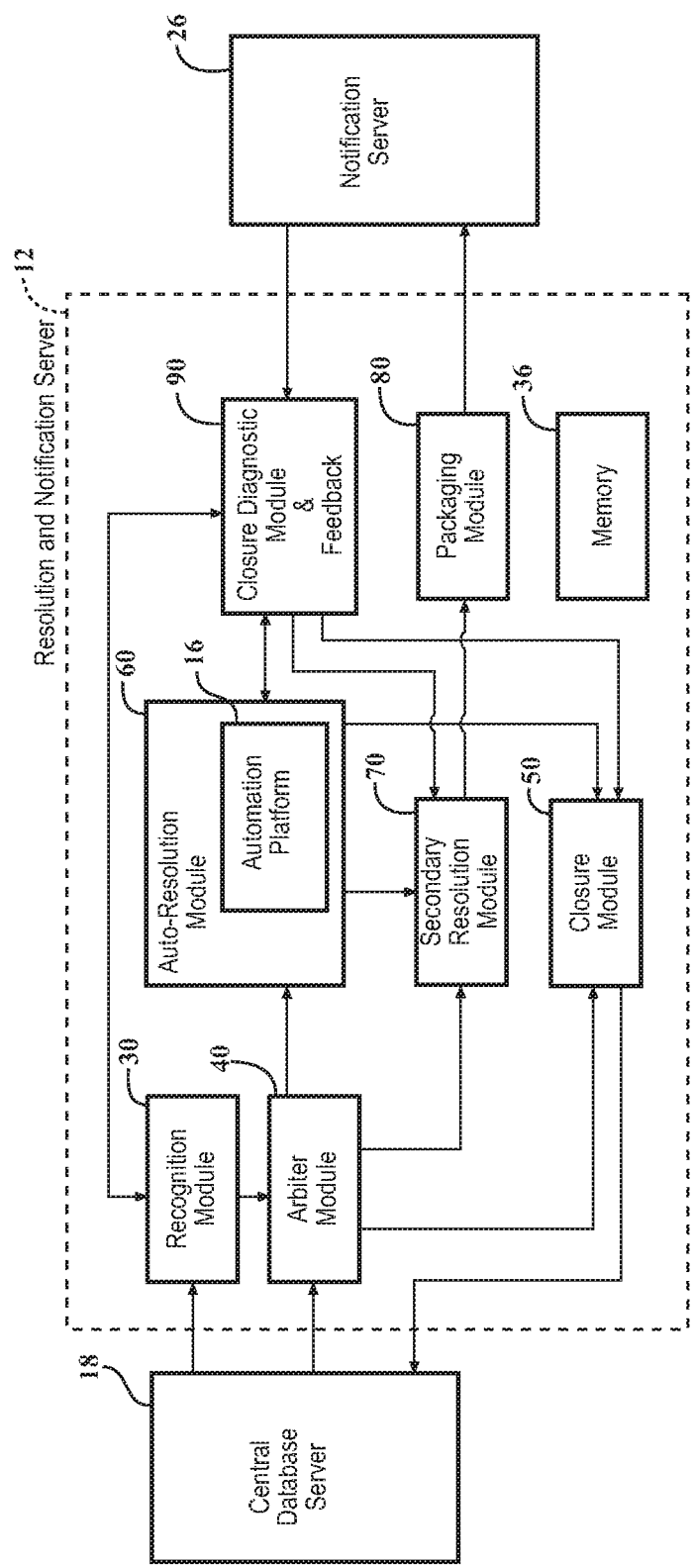
FIG. 2 is block diagram of one embodiment of a resolution and notification server of the IT network having modules for executing a computer-implemented method to provide automated resolution and notification of a fault detected about a device monitored by an IT fault monitoring server.

Referring to FIG. 2, a block diagram is provided introducing modules of the of the RN server 12 enabling implementation of a computer-implemented method 100 (see FIGS. 3A-3C) for providing automated resolution and notification of the fault detected for the device 20 monitored by the IT fault monitoring server 14.

In FIG. 2, the RN server 12 comprises a recognition module 30, an arbiter module 40, a closure module 50, an auto-resolution module 60, a secondary resolution module 70, a packaging module 80 and a closure diagnostic and feedback module 90. The modules may be in communication with each other and with other servers, such as the central database server 18 and notification server 26, as shown in FIG. 2. However, depending on the configuration of the modules, and implementation of the method 100 described below, such communication may be different than as shown in FIG. 2. Automated computer-implemented techniques executed by each module are described below.

Figure 3A:
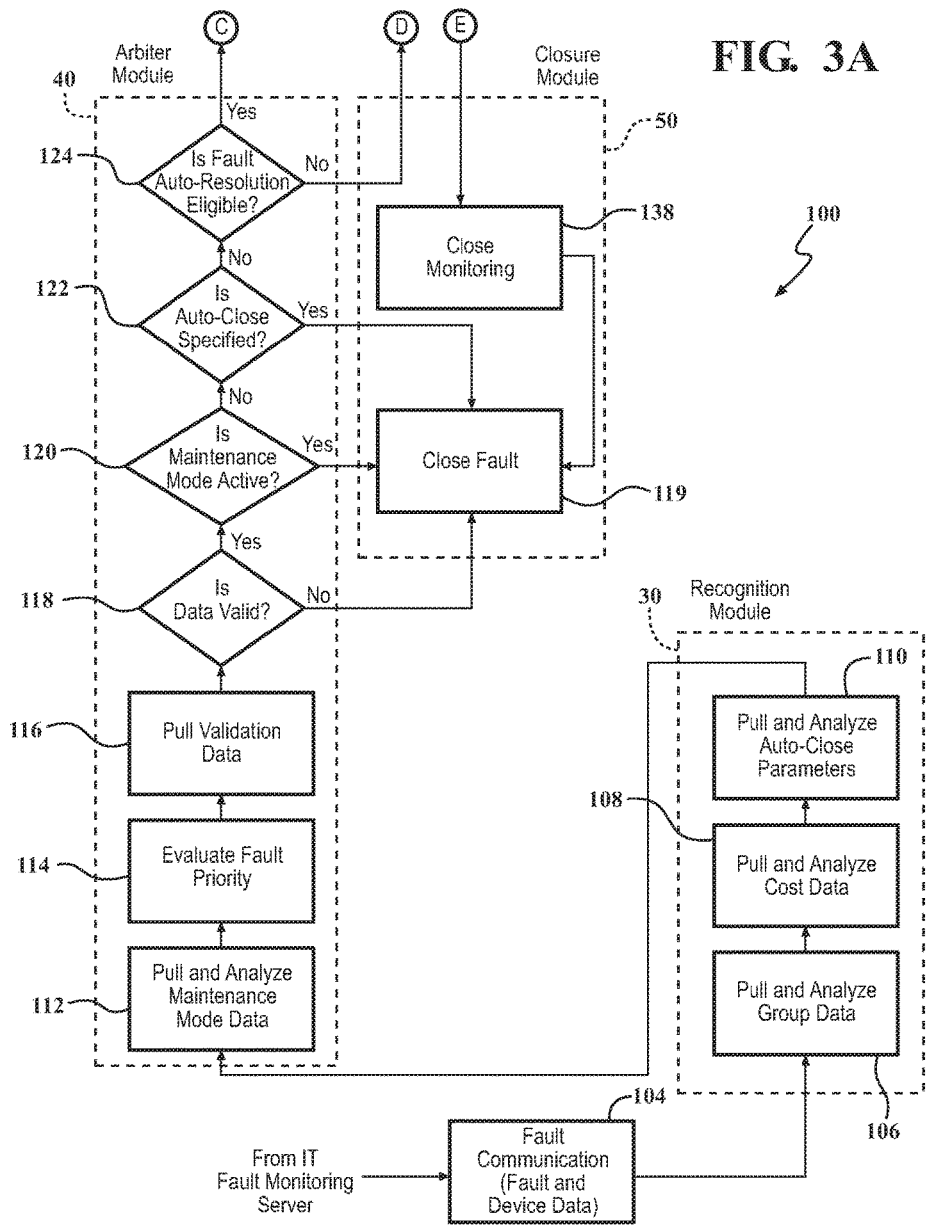
FIG. 3A is a flowchart of certain features of the computer-implemented as implemented by a recognition module, an arbiter module, and a closure module of the resolution and notification server.
Figure 3B:
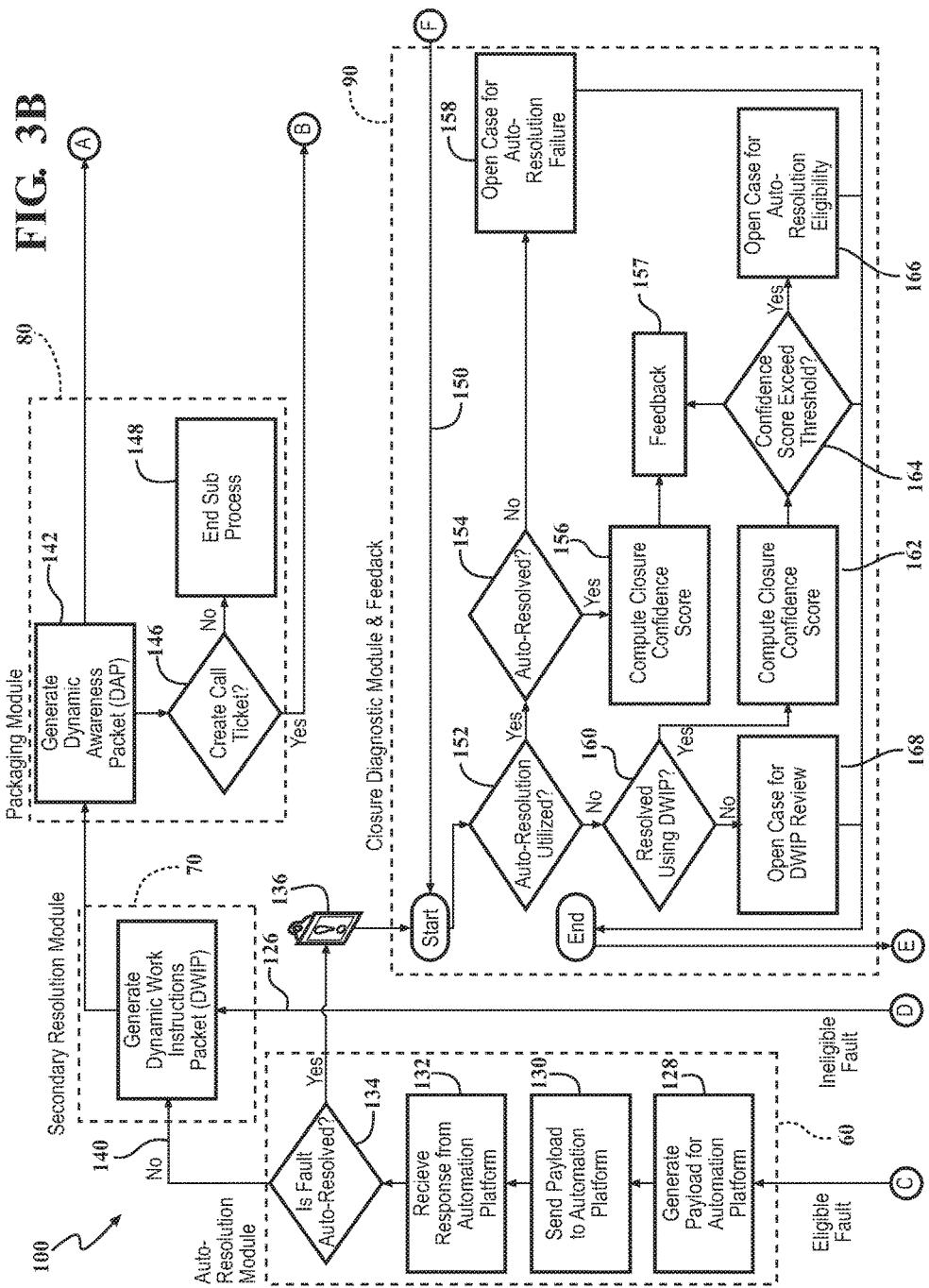
FIG. 3B is a flowchart continuing from FIG. 3A of further features of the computer-implemented method as implemented by an auto-resolution module, a secondary resolution module, a packaging module and a closure diagnostic module of the resolution and notification server.
Figure 3C:
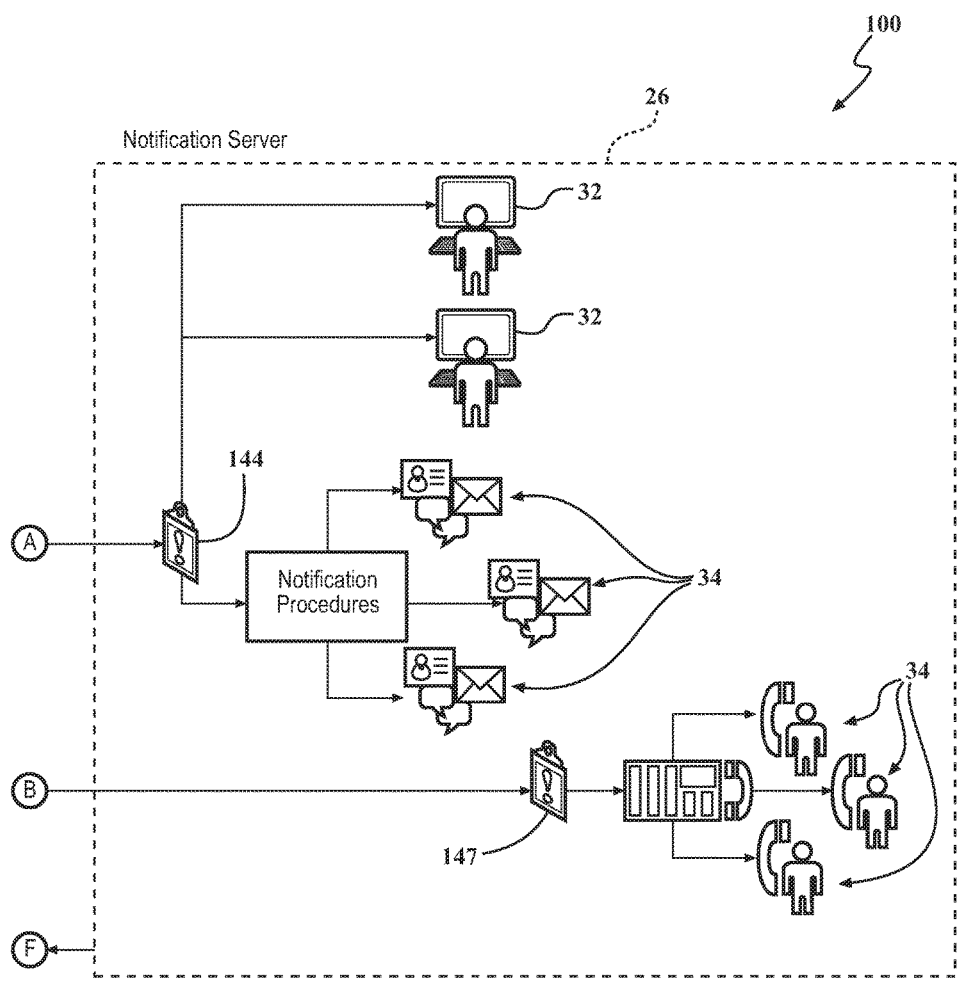
FIG. 3C is a flowchart continuing from FIG. 3B of further features of the computer-implemented method as implemented in conjunction with a notification server in communication with the resolution and notification server.

FIGS. 3A-3C provide a detailed flowchart illustrating one embodiment of the computer-implemented method 100 for providing automated resolution and notification of the fault. Referring to FIG. 3A, the method 100 initiates when the IT fault monitoring server 14 detects the fault and at step 104, an initial fault communication (e.g., call) is received by the RN server 12 from the IT fault monitoring server 14. The RN server 12 may receive the call from the IT fault monitoring server 14 utilizing the REST API 28, as shown in FIG. 1. The call may comprise fault data provided by the IT fault monitoring server 14 relating to the detected fault. Such fault data may include, but is not limited to identity of the fault check, messages about the fault, fault impact data or parameters, fault urgency data or parameters, unique ID of each fault check, devices 20 that have been checked, data matching checked devices 20 to configuration items specified by the central database server 18, and the like. Such fault data may also include data related to the monitored device 20, e.g., unique ID, device name, device state, IP address, etc. The IT fault monitoring server 14 may provide any other suitable data related to the fault other than those described herein.

In FIG. 3A, the recognition module 30 is triggered after receiving the fault data from the IT fault monitoring server 14. The recognition module 30 is automated to select a contact group 34 from among a selection of contact groups 34 to contact about the fault. The recognition module 30 is further automated to select one or more IT resolution groups 32 to address the fault. Designating the contact group 34 and IT resolution groups 32 in advance optimizes the method 100 and enables automated resolution and notification of the fault at the end of the workflow.

To implement this technique, the recognition module 30 at step 106, is automated to pull and analyze contact data from the central database server 18. Such contact data may include, for example, MSP assignment data, support team configurations, special instructions data, use default data, route-to-service desk configurations, contact on-call configurations, auto-close ticket data, and call tree parameters defining MSP contact preferences, e.g., contact, call back, order/priority, etc. In one example, the contact data may specify that the MSP requires resolution of the fault using IT resolution groups 32 from a certain jurisdiction or country. The contact data may include a contact forest comprising a contact hierarchy of structured fault trees with escalation schedules, costs, special instructions and methods of contact specifically configured for each contact group 34. The contact data may be configured and viewed by contact groups 34 using the access device 24 and portal server 22. In some instances, default data from the central database server 18 may be populated for any of the contact groups 34, including default data related to the type of monitored device 20 configured at a more global level. The default data may be overridden for specific values at a more detailed granular level. The recognition module 30 analyzes the contact data in conjunction with the fault and device data provided from the IT fault monitoring server 14 to designate the specific contact group 34 and IT resolution group 32 to contact regarding the fault. Several of the downstream procedures described below rely on group designations determined by the recognition module 30.

To further facilitate group recognition, at step 108, the recognition module 30 pulls and analyzes, from the central database server 18, historical data for which cost determinations may be made related to the fault. Such historical data may relate to a cost factor per resource, a cost factor to resolve the fault, a time factor for resolution of the fault, and the like. The historical data may be specifically tailored based on the designated contacts from step 106. Such historical data may be analyzed to assign costs to each contact as a way to optimize a least costly path of resolution. For example, cost optimization may be provided by the recognition module 30 to select lower cost escalation points based upon several factors including fault priority, fault severity, fault aging time, elapsed cost of fault, and the like. Such cost optimization may be configurable per monitored device 20, check or organizational unit.

Step 108 may be reserved for non-critical monitored devices 20 or faults. In such instances, the recognition module 30 may implement a standard adherence specifying a standard balance following the results of the analysis from step 106 with no particular special weighting towards cost analysis. For example, the recognition module 30 may optimize work resolution as specified by the fault tree unless escalation route optimizing is permissible.

At step 110, the recognition module 30 is automated to pull and analyze auto-closure parameters provided from the central database server 18. The auto-closure parameters may be specified based on the specific monitored device 20, fault data, and auto-closure preferences specified by the selected contact group 34. For example, some MSPs may authorize auto-closure of the fault while other may not. As described below, the auto-closure parameters are utilized downstream by the arbiter module 40. Steps 106, 108 and 110 may occur in any suitable order other than that shown in FIG. 3A.

With the preliminary data gathering and contact designation executed by the recognition module 30, the method 100 proceeds with the arbiter module 40 which is automated to arbitrate a resolution path for the fault. The arbiter module 40 delivers real-time advanced service checking and is the main decision processor predicting resolution and deciding how to resolve faults using appropriate support parties. The arbiter module 40 relays information to the secondary resolution module 70 for generation of support information likely to resolve the fault or relays information to the auto-resolution module 60 for auto-resolution of the fault while providing notification to appropriate parties that need to be aware of the fault in progress.

To implement this technique, the arbiter module 40 at step 112 pulls and analyzes data from the central database 19 relating to maintenance modes. The maintenance mode data defines whether an active maintenance window is specified by the MSP for the monitored device 20. Data relating to maintenance modes may be customized based on determinations from the recognition module 30. When the maintenance window is active, faults do not come into the RN server 12 from the IT fault monitoring server 14. The maintenance window may be set on a reoccurring schedule such that the maintenance window runs, e.g., at specified times of the day, specified days, every day, every week, every month, etc. The arbiter module 40 gathers maintenance mode data for closure analysis, described below.

At step 114, the arbiter module 40 evaluates and determines a priority of the fault. The priority of the fault indicates how severe the fault is from a consequence and timing perspective. The priority provides direction as to how the fault should be processed by the method 100. To facilitate this determination, the arbiter module 40 pulls data from the central database server 18. In one embodiment, the arbiter module 40 extracts a customized priority matrix to which fault data is compared. The priority matrix may be customized based on recognition module 30 outcomes. The priority matrix may include a scale of impact values and a scale of urgency values. The impact values may for example indicate a high, medium, or low impact of the fault on the monitored device 20. The urgency values may for example indicate a high, medium, or low timing urgency for resolution of the fault. The arbiter module 40 inputs or applies the fault data to the priority matrix and determines a priority value indicating the determined priority of the fault. The priority value may be for example indicate an urgent, high, medium or low priority for the fault. The priority value may be calculated for example by applying a weighting sum algorithm to the impact and urgency values. Thus, if the impact and urgency values are low, then the priority value is low. Similarly, if the impact and urgency values are high, then the priority value is high.

In some instances, even if the fault priority can be determined, it may be that the fault data is incomplete or invalid. To ensure that the fault is legitimate, the arbiter module 40 at step 116 pulls validation data relating to the fault. In one embodiment, the validation comprises fault data, device data, the fault priority value, and the designated contact group 34 and IT resolution group 32 determined by the recognition module 30.

At step 118, the arbiter module 40 evaluates the validity of the pulled data from step 116. Some or all of the pulled data may be assessed for validation. For example, data is valid if the pulled dataset fully populates specific columns of a validation matrix. If any column is blank or null, then the data is invalid and the fault will not continue for resolution. In one embodiment, the data validation procedure produces a logical value. If the outcome of step 118 is "No" meaning that the data is not valid, the arbiter module 40 instructs auto-closure of the fault, at step 119. To formally close the fault, the arbiter module 40 invokes the closure module 50.

On the other hand, if the outcome of step 118 is "Yes" meaning that the data is valid, the method 100 proceeds to step 120 wherein the arbiter module 40 evaluates the maintenance mode data from step 112 to determine whether or not a maintenance mode or window is present or active. If the outcome of step 120 is "Yes" meaning that there is an active maintenance mode for the monitored device 20, the arbiter module 40 instructs auto-closure of the fault at step 119.

If, however, the outcome of step 120 is "No" meaning that there is currently no active maintenance mode for the monitored device 20, the method 100 proceeds to step 122 wherein the arbiter module 40 analyzes auto-closure parameters associated with the monitored device 20 and fault data. Here, auto-closure parameters are preset parameters specified by the MSP for the specific device 20 and/or detected fault. For instance, the MSP may desire that certain faults not be processed for resolution and therefore, should be auto closed. This type of auto-closure is distinguished from closure that may result from the outcomes of steps 118, 120. The auto-closure parameters may be specified by and pulled from the IT fault monitoring server 14, and in some instances, the central database server 18. The recognition module 30 may also extract auto-closure parameters specific to the MSP. If the device 20 and fault pair have auto-closure parameters set, then the outcome of step 122 is "Yes" meaning that auto-closure is specified and the arbiter module 40 instructs auto-closure of the fault, at step 119.

It is to be appreciated that, even if closed for resolution at step 119, the fault may continue to be monitored by the IT fault monitoring server 14 or by creation of an electronic monitoring ticket at the RN server 12. Alternatively, the electronic monitoring ticket may be generated beforehand and closed at step 119. These potential auto-closure determinations 118, 120, 122 implemented by the arbiter module 40 provide a coarse filter and efficient disposition of faults that are otherwise not suitable for the downstream resolution thereby freeing up human and computing resources for faults requiring more care.

If, on the other hand, the device 20 and fault pair do not have auto-closure parameters set, then the outcome of step 122 is "No" meaning that auto-closure is not specified and the arbiter module 40 proceeds to step 124. At step 124, the arbiter module 40 determines eligibility of the fault for assessment by an auto-resolution procedure, which is described below. The arbiter module 40 determines such eligibility based on the fault data and data related to the monitored device 20. In the embodiment of FIG. 3A, the auto-resolution eligibility assessment of step 124 is conducted only when the arbiter module 40 determines that the fault data is valid (at step 118), the planned maintenance window is not present (at step 120) and the auto-closure parameters are not set (at step 122). This way, auto-resolution resources are preserved for appropriate faults. Inputs into the arbiter module 40 for making this determination include, but are not limited to, MSP specified preferences/authorization regarding auto-resolution, auto-resolution parameters in the automation platform 16 related to the fault and/or monitored device, feedback from the closure diagnostic module 90 (described below), and previous resolution success rates using closure confidence score and work instructions (DWIP) for similar types or systems and/or faults, number of repeat matching incidents, and the like.

If the outcome of step 124 is "No" meaning that the fault is ineligible and should not follow the auto-resolution procedure, then the method 100 proceeds to step 126, wherein the arbiter module 40 instructs the secondary resolution module 70 (FIG. 3B) to generate an electronic dynamic work instruction packet (DWIP). The secondary resolution module 70 is intended to serve the secondary purpose of generating such predictive work instructions when the fault is primarily ineligible for auto-resolution or cannot be auto-resolved. The term "secondary" is intended to mean supplementary rather than inferior. The DWIP comprises special instructions specifically tailored for resolution of the identified fault (and device) by the selected IT resolution group 32. The secondary resolution module 70 dynamically creates this instructional work resolution electronic packet of information designed to inform the selected IT resolution group 32 of potential work resolution steps with historical work resolution notes and steps (if applicable). Since the DWIP is generated before the selected IT resolution group 32 attempts to resolve the fault, the DWIP thereby provides predictive resolution instructions. The DWIP is electronically transmitted to IT resolution group 32 (as described below). The DWIP may be continually updated and improved based on feedback from the closure diagnostic module 90, described below.

On the other hand, if the outcome of step 124 is "Yes" meaning that the fault is eligible and should follow the auto-resolution procedure, the arbiter module 40 invokes the auto-resolution module 60. To implement the auto-resolution procedure, the auto-resolution module 60 works in conjunction with the automated platform 16. Specifically, at step 128, the auto-resolution module 60 generates payload relating to the fault for the automation platform 16. Here, the term "payload" is intended to describe actual data relating to the fault without particular reference to computing protocols used for transmitting such data. In other words, transmissions of data packets include both overhead/header information, which is the source and destination of the packet, and the actual data being sent (i.e., payload). Since the overhead/header information is utilized only for transmission purposes, step 128 is performed only with respect to the payload. Payload data may be re-used and applied to similar types of faults on other systems.

Once the payload is generated, the auto-resolution procedure continues to step 130, wherein the auto-resolution module 60 transmits the payload to the automation platform 16 for investigation of the fault. Here, transmission of the payload may include the aforementioned described overhead/header information, which is removed from the packet when the packet reaches the automation platform 16. Therefore, the payload is the only data processed by the automation platform 16. Once the automation platform 16 receives the payload, the automation platform 16 automatically attempts to resolve the fault based upon matching incident with predictive resolution notes and confidence intervals. This procedure may have different approaches depending on the detected fault. For example, the automation platform 16 may extract credentials for the monitored device 20 subject to the fault from a password vault stored in non-transitory memory for authentication purposes. The automation platform 16 may further attempt to gather any additional information about the monitored device 20 from the central database server 18 or directly from the monitored device 20 itself. With such data gathered, the automation platform 16 will check for online availability of the monitored device 20 and may attempt to log into the monitored device or check service status 20 if online. The automation platform 16 then runs specified resolution criteria such as for example, expanding virtual file space partitions to resolve an issue of full disk error against the monitored device 20, and the like. The state of the monitored device 20 is then evaluated to determine if the resolution process resolved the fault.

Thereafter, the automation platform 16 will generate and send to the auto-resolution module 60 an auto-resolution status of the fault based on the outcome of the attempted auto-resolution. The automation platform 16 may further generate and send for reference a digital log of what auto-resolution criteria and procedures were performed as well as any predictive suggestions for further review. The digital log may be reserved in instances where auto-resolution of the fault was unsuccessful by the automaton platform 16. The response from the automation platform 16 may be payload as well.

At step 132, the auto-resolution module 60 receives the auto-resolution status of the fault (and any additional information) from the automation platform 16. The auto-resolution status may indicate, for example, that the fault is auto-resolved or non-auto-resolved. At step 134, the auto-resolution module 60 analyzes the auto-resolution status of the fault and instructs closure of the fault if the auto-resolution status indicates that the fault is auto-resolved. To do so, the auto-resolution module 60 may invoke the closure diagnostic module 90 for processing of the auto-resolved fault. Closure diagnostic processing is described in detail below. The API 28 may be utilized to receive the auto-resolution status if the automation platform 16 is implemented on a different server from the RN server 12.

Since the fault is auto-resolved, the auto-resolution module 60 may bypass generation of the DWIP at the secondary resolution module 70. However, in some instances, it may be desirable to nonetheless generate the DWIP for providing reference to the IT resolution group 32 as there may be subsequent issues related to another system or application, for example a fault at the operating system layer may require an automated resolution at the OS, and either a manual or auto-resolved issue to the overlying application such as an application restart in some cases.

Optionally, at step 136, the electronic monitoring ticket may be generated to note occurrence of the fault and/or to inform the IT fault monitoring server 14 to continue to monitor the auto-resolved fault to determine, for example, continued behavior of the fault, and the like. This monitoring may be closed at step 138 (FIG. 3A) for various reasons, including but not limited to, absence of the fault from the monitored device 20, lapse of a predetermined period of time, or the like.

If the auto-resolution status from the automation platform 16 indicates that the fault is non-auto-resolved, the auto-resolution module, at step 140, instructs generation of the DWIP at the secondary resolution module 70. Compared with step 126 wherein the DWIP comprises special instructions specifically tailored for resolution of the ineligible fault, at step 140, the DWIP comprises special instructions specifically tailored for resolution of the non-auto-resolved fault. Payload from the automation platform 16 may be utilized to feed generation of the DWIP at step 140.

Upon processing of the fault, the automation platform 16 optionally may be configured to directly notify the IT fault monitoring server 14 with key data informing that the auto-resolved fault has been acknowledged or closed. The automation platform 16 may notify the IT fault monitoring server 14 utilizing the API 28, as shown in FIG. 1. Furthermore, the central database server 18 may be continuously updated by the automation platform 16, or the RN server 12 generally, about the resolution status of faults to facilitate artificial intelligence building for future resolution.

With continued reference to FIG. 3B, the secondary resolution module 70 communicates with the packaging module 80, which is automated to communicate with the notification server 26 to send specially tailored and enveloped notifications and messages.

The packaging module 80, at step 142, optionally is automated to generate a dynamic awareness packet (DAP) specifying parameters for alerting or providing awareness to any one or more contact groups or the selected contact group 34, and/or the IT resolution group 32 about the fault. Specifically, the fault is either an ineligible fault (from step 126) or a non-auto-resolved fault (from step 140), both of which require additional contact for resolution and notification. In other words, notification escalation of auto-resolved faults, although possible, may not be desired because the fault likely does not require escalation because the fault is auto-resolved.

The DAP is generated to inform the groups 32, 34 of the situation surrounding the fault as well as any other information gathered or generated from the method 100 regarding the fault, including affected systems, known impact, estimated resolution time, and the like. Thus, the DAP is automated to provide service escalation notification based upon advanced intelligence using the techniques described herein.

Although the DAP may reach the IT resolution group 32, the DAP is preferably reserved for informing the contact groups 32 (non-resolving entities) of the fault. If the DAP is not used for the IT resolution group 32, generation of the DAP at step 142 may be bypassed enabling the DWIP at step 126, 140 to pass directly to the IT resolution group 32 through to the notification server 26.

As shown in FIG. 3B, the DAP is preferably generated after the DWIP is generated. Mainly, the DAP may include information related to the DWIP for enabling notification of multiple parties with specifically configured predictive resolution based upon recognition. The DAP may contain less technical information regarding resolution instruction, but more information focused to the non-technical audience for their awareness to assure them during a fault, such as impacted hosts and applications, associated systems, known times of incidents, estimated resolution times, locations, support teams, support and conference bridge or portal login information, backup and disaster recovery related information and the like.

With the DAP generated at step 142, the method 100 may proceed to step 144 in FIG. 3C wherein the electronic monitoring ticket about the ineligible or non-auto-resolved fault is generated. The electronic monitoring ticket may provide real-time updates to the selected groups 32, 34 through iterative generation of the DAP at step 142. Such updates may be continually provided until occurrence of a predetermined event, such as closure of the fault, resolution of the fault or the like. In FIG. 3C the electronic monitoring ticket is generated at the notification server 26 after transmission of the DAP. However, it is to be appreciated that the electronic monitoring ticket may be generated by the packaging module 80 instead.

Transmission of the DAP and/or the electronic monitoring ticket to the selected groups 32, 34 is performed utilizing a computer-implemented form of secure electronic communication. For the selected contact group 34, transmission of the DAP and/or the electronic monitoring ticket may occur using an email routing system, a chat hosting system, a text routing system, short message service (SMS) system or the like. Notification procedures defined by the packaging module 80 (or DWIP) and/or notification server 26 may be executed to implement proper routing and transmission pursuant to the electronic monitoring ticket.

Referring back to FIG. 3B, if specified based on the DWIP or any other pulled data (e.g., pulled group data at step 106), the packaging module 80 at step 146 is automated to determine whether to create an electronic call ticket about the ineligible or non-auto-resolved fault. If the outcome of step 146 is "No", the sub-process in packing is ended at step 148. Even if the sub-process ends at step 148, the electronic monitoring ticket 144 may nevertheless be generated. If the outcome of step 146 is "Yes", then the packaging module 80 at step 148 instructs execution of the call ticket 147 (FIG. 3C) to the selected contact group 34. The selected contact group 34 is contacted based on data from the recognition module 30, and more specifically, the group data pulled at step 106. The group data may include instructions on who or how to call the contact group 34 based on information such as the call tree, and the like. Although not shown, the call ticket 147 in FIG. 3C may be linked to the monitoring ticket 144.

In FIG. 3C, the call ticket 147 is executed at the notification server 26 utilizing a telephonic form of communication, such as a telephonic routing system (e.g., a hosted, virtual or mobile PBX system). Telephonic calls are executed securely and may be executed using an automated/robotically generated message populated based on the contents of the DAP. For example, a call may include the affected systems, known incidents, supporting parties, estimated restore times, backup and disaster recovery information as well as references to conference bridge information and instruction for obtaining more details on the fault.

Eventually, data or status updates generated by the IT resolution group 32 regarding attempted or completed closure of the ineligible or non-auto-resolved fault is received back at the RN server 12 at step 150 in FIG. 3B. Specifically, such data or status updates are fed into the closure diagnostic module 90. Thus, both auto-resolved faults (from step 136) and ineligible or non-auto-resolved faults (from step 150) are fed back into the closure diagnostic module 90 and may optionally be closed at step 138 of the closure module 50.

The closure diagnostic module 90 implements a sub-process to evaluate closures for artificial intelligence generation, predictive resolution feedback, and for proactive review suggestions. In FIG. 3B, the closure diagnostic module 90 implements the sub-process with input from the aforementioned faults (steps 136, 150) at "start". At step 152, the closure diagnostic module 90 determines whether auto-resolution was utilized for the inputted fault. The determination at step 152 may be made based on the determined eligibility of the fault at step 124, for example. If the outcome of step 154 is "Yes" then the closure diagnostic module 90 evaluates whether the eligible fault was auto-resolved using the described auto-resolution process at step 154. The determination at step 154 may be made based on the auto-resolution outcome of the fault at step 134, for example.

If the outcome of step 154 is "Yes" then the sub-process continues to step 156. At step 156, parameters related to the auto-resolved fault are evaluated with a closure confidence algorithm. Mainly, a closure confidence score associated with the auto-resolved fault is computed. This score is used to determine the effectiveness of the auto-resolution procedure for this fault. Through successful resolutions, the auto-resolution procedure may be continually modified to provide a high degree of confidence (using confidence intervals) that a certain resolution will resolve the specific fault based upon host, landscape, service check fault, etc. The closure confidence score may be any suitable value and be within any predefined range. The closure confidence score may be incremented (increased) if the auto-resolution was successful for the fault. Based on the outcome of the score computation at step 156, the closure diagnostic module 90 is further configured to provide feedback at step 157 for continuously improving the auto-resolution procedure. For feedback 157, the closure diagnostic module 90 may generate feedback scripts (PowerShell, Python, Bash, Ruby, etc.) which can be fed into the automation platform 16 for updates. In some instances, the auto-resolution module 60 may be updated based on feedback 157 to generate different payload for the automation platform (at step 128) and/or to exhibit real-time updated parameters regarding auto-resolution of the fault (at step 134). The closure confidence score and/or the feedback scripts may be stored in memory 36 for access by the auto-resolution module 60 or any other module implementing the method 100.

If the outcome of step 154 is "No" meaning that the eligible fault inputted into the closure diagnostic module 90 was not successfully auto-resolved (non-auto-resolved), the sub-process proceeds to step 158 wherein the closure diagnostic module 90 is automated to instruct opening of an electronic ticket (or case, flag etc.) promoting investigation or review of the auto-resolution failure. In other words, there may be some instances where manually tweaking of the auto-resolution procedure is desirable for "troubleshooting" purposes. The closure diagnostic module 90 may contact the appropriate IT resolution group 32 regarding review of the auto-resolution failure 158 based on any of the techniques described herein.

At step 152, if the closure diagnostic module 90 determines that the auto-resolution procedure was not utilized, then the fault was most likely ineligible for auto-resolution and the sub-process proceeds on a different branch to step 160, wherein the closure diagnostic module 90 evaluates whether the ineligible fault was successfully resolved using the DWIP. Input into step 160 may be based on the data provided from the IT resolution group 32 at step 150.

If the ineligible fault was successfully resolved using the DWIP, the sub-process proceeds to step 162 wherein parameters related to the ineligible fault are evaluated with the closure confidence algorithm. Mainly, the closure confidence score associated with the ineligible fault is computed. This score is used to determine the effectiveness of the generated DWIP for this fault. Through successful resolutions, the DWIP may be continually modified to provide a high degree of confidence (using confidence intervals) that a certain resolution will resolve the specific fault. The closure confidence score may be incremented (increased) if the resolution based on the DWIP was successful for the fault.

This may be performed at step 164 wherein the closure confidence score for the ineligible fault is evaluated with respect to a predetermined threshold value. As the confidence score is iteratively incremented through successful resolutions, the score may eventually meet or exceed the predetermined threshold. The predetermined threshold may be specifically chosen such that the threshold represents an acceptable level of resolution to confer review for auto-resolution eligibility. If the threshold is met or exceeded at step 164, the closure diagnostic module 90 instructs opening of an electronic ticket (or case, flag, etc.) promoting investigation or review of the fault for auto-resolution eligibility at step 166. In other words, it may be desirable to have the IT resolution group 32 investigate the fault to determine whether the fault is suitable for auto-resolution. The closure diagnostic module 90 may contact the appropriate IT resolution group 32 regarding review of the fault for auto-resolution eligibility 166 based on any of the techniques described herein.

Optionally, the outcome of the threshold comparison at step 164 may be automatically fed into feedback 157 for updating, continuous intelligence building, and automated improvement of any of the modules implementing the method 100. For example, the arbiter module 40 may be modified using the feedback scripts to provide real-time updated parameters about whether the fault is eligible for auto-resolution (at step 124). Additionally, generation of the DWIP at the secondary resolution module 70 may be updated based on the feedback 157. In yet another example, the central database server 18 may be updated with cost data (pulled by the recognition module at step 108) that is computed or analyzed by the closure diagnostic module 90 based on closure score review. Thus, opening the electronic ticket for auto-resolution review at step 166 may be bypassed when this automated feedback technique is utilized.

If the ineligible fault was unsuccessfully resolved using the DWIP, then the outcome of step 160 is "No" and the sub-process proceeds to step 168 wherein the closure diagnostic module 90 instructs opening of an electronic ticket (or case, flag, etc.) promoting investigation or review of the DWIP for fault. In other words, it may be desirable to have the IT resolution group 32 investigate the DWIP to troubleshoot the dynamic work instructions. The closure diagnostic module 90 may contact the appropriate IT resolution group 32 regarding review of the DWIP 168 based on any of the techniques described herein. As mentioned, using automated techniques, the DWIP may be automatically updated based on feedback 157 from the closure diagnostic module 90. With continuous closed-loop checking with the closure diagnostic module 90, the DWIP may be improved progressively and automatically until auto-resolution eligibility is reached. In such instances, opening the electronic ticket for review of the DWIP at 168 may be bypassed when this automated feedback technique is utilized.

At the closure diagnostic module 90, if the confidence score does not meet or exceed the threshold at step 164, if the case for auto-eligibility is opened at step 166, or if the case for review of the DWIP is opened at step 168, then the sub-process proceeds to an "end" step wherein either the sub-process ends or formal closure of the fault is instructed at step 119.

Any of the steps described for the computer-implemented method 100 may be in modules other than those that encompass the steps in FIGS. 3A-3B. Furthermore, any step of the method 100 wherein determinations are made may provide an outcome other than "Yes" and "No", as described herein for simplicity. For example, the outcomes of such steps may be any term, text, value, Boolean logic value (e.g., true/false, /0/1), or any more complex computer-executable instruction for triggering the next respective step based on the outcome.

Several embodiments have been described in the foregoing description. However, the embodiments discussed herein are not intended to be exhaustive or limit the invention to any particular form. The terminology, which has been used, is intended to be in the nature of words of description rather than of limitation. Many modifications and variations are possible in light of the above teachings and the invention may be practiced otherwise than as specifically described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A resolution and notification server being configured to provide automated resolution and notification of a fault detected for a device monitored by an information technology (IT) fault monitoring server, the resolution and notification server comprising:
a recognition module being automated to:
receive fault data relating to the fault from the IT fault monitoring server; and
analyze the fault data to select a contact group from among a selection of contact groups to contact about the fault;
an arbiter module being automated to:
determine priority of the fault, validity of the fault data, and whether a planned maintenance window associated with the device is present;
instruct auto-closure of the fault for monitoring purposes if the fault data is invalid or that the planned maintenance window is present;
determine eligibility of the fault for assessment by an auto-resolution procedure if the fault data is valid and the planned maintenance window is not present; and
instruct generation of an electronic dynamic work instructions packet comprising instructions for resolution of the fault by an IT resolution group if the fault is ineligible for assessment by the auto-resolution procedure; and
an auto-resolution module being automated to:
execute the auto-resolution procedure if the arbiter module determines that the fault is eligible for assessment by the auto-resolution procedure wherein the auto-resolution procedure is automated to generate payload relating to the fault, transmit the payload to an automation platform to investigate the fault, and receive an auto-resolution status of the fault from the automation platform;
instruct closure of the fault if the auto-resolution status from the automation platform indicates that the fault is auto-resolved; and
instruct generation of the electronic dynamic work instructions packet if the auto-resolution status from the automation platform indicates that the fault is non-auto-resolved.

2. The resolution and notification server of claim 1 wherein the contact group is one of a customer, service provider, or third party organization and wherein the recognition module is automated to analyze one or more of the following to select the contact group:
contact group designations associated with the device and fault data;
auto-closure parameters associated with the device and fault data; and
historical data relating to one or more of a cost factor per resource, a cost factor to resolve the fault, and a time factor for resolution of the fault.

3. The resolution and notification server of claim 1 wherein the arbiter module is automated to analyze auto-closure parameters associated with the device and fault data to instruct auto-closure of the fault for monitoring purposes.

4. The resolution and notification server of claim 1 wherein the recognition module is automated to receive fault data with a call from the IT fault monitoring server utilizing a representational state transfer application programming interface.

5. The resolution and notification server of claim 1 wherein the automation platform is automated to notify the IT fault monitoring server to close the auto-resolved fault utilizing a representational state transfer application programming interface.

6. The resolution and notification server of claim 1 further comprising a closure diagnostic module being automated to:
compute a closure confidence score associated with the auto-resolved fault; and
store the closure confidence score for access by the auto-resolution procedure.

7. The resolution and notification server of claim 1 further being automated to instruct closure of the ineligible or non-auto-resolved fault if the ineligible or non-auto-resolved fault has been resolved by the IT resolution group pursuant to the electronic dynamic work instructions packet and further comprising a closure diagnostic module being automated to compute a closure confidence score associated with the ineligible or non-auto-resolved fault.

8. The resolution and notification server of claim 7 wherein the closure diagnostic module is automated to:
evaluate the closure confidence score with respect to a predetermined confidence threshold; and
trigger a review flag if the closure confidence score meets or exceeds the predetermined confidence threshold wherein the review flag is configured to suggest consideration of the ineligible or non-auto-resolved fault for auto-resolution according to the auto-resolution procedure.

9. The resolution and notification server of claim 1 further comprising a packaging module being automated to:
generate a dynamic awareness packet with parameters to alert any one or more contact groups or the IT resolution group about the ineligible or non-auto-resolved fault;
create an electronic monitoring ticket related to the ineligible or non-auto-resolved fault; and
transmit the electronic monitoring ticket to any one or more contact groups or the IT resolution group with a computer-implemented form of electronic communication.

10. The resolution and notification server of claim 1 further comprising a packaging module being automated to:
generate a dynamic awareness packet with parameters to alert the selected contact group about the ineligible or non-auto-resolved fault;
create an electronic call ticket about the ineligible or non-auto-resolved fault; and
instruct execution of the call ticket to the selected contact group for resolution with a telephonic form of communication.

11. A computer-implemented method implemented on a resolution and notification server for providing automated resolution and notification of a fault detected for a device monitored by an information technology (IT) fault monitoring server, the method comprising:
receiving fault data relating to the fault from the IT fault monitoring server;
analyzing, with a recognition module, the fault data to select a contact group from among a selection of contact groups to contact about the fault;

determining, with an arbiter module, priority of the fault, validity of the fault data, and whether a planned maintenance window associated with the device is present;

instructing, with the arbiter module, auto-closure of the fault for monitoring purposes if the arbiter module determines that the fault data is invalid or that the planned maintenance window is present;

determining, with the arbiter module, eligibility of the fault for assessment by an auto-resolution procedure if the fault data is valid and the planned maintenance window is not present;

instructing generation of an electronic dynamic work instructions packet comprising instructions for resolution of the fault by an IT resolution group if the arbiter module determines that the fault is ineligible for assessment by the auto-resolution procedure;

executing, with an auto-resolution module, the auto-resolution procedure if the arbiter module determines that the fault is eligible for assessment by the auto-resolution procedure wherein the auto-resolution procedure comprises generating payload relating to the fault, transmitting the payload to an automation platform for investigation of the fault, and receiving an auto-resolution status of the fault from the automation platform;

instructing, with the auto-resolution module, closure of the fault if the auto-resolution status from the automation platform indicates that the fault is auto-resolved; and instructing generation of the electronic dynamic work instructions packet if the auto-resolution status from the automation platform indicates that the fault is non-auto-resolved.

12. The computer-implemented method of claim 11 wherein the contact group is one of a customer, service provider, or third party organization and wherein selecting the contact group occurs in response to one or more of:
analyzing contact group designations associated with the device and fault data;
analyzing auto-closure parameters associated with the device and fault data; and
analyzing historical data relating to one or more of a cost factor per resource, a cost factor to resolve the fault, and a time factor for resolution of the fault.

13. The computer-implemented method of claim 11 wherein instructing, with the arbiter module, auto-closure of the fault for monitoring purposes occurs in response to analyzing auto-closure parameters associated with the device and fault data.

14. The computer-implemented method of claim 11 wherein receiving fault data relating to the fault further comprises receiving a call with the fault data from the IT fault monitoring server utilizing a representational state transfer application programming interface.

15. The computer-implemented method of claim 11 further comprising notifying the IT fault monitoring server with the automation platform to close the auto-resolved fault, wherein the automation platform notifies the IT fault monitoring server utilizing a representational state transfer application programming interface.

16. The computer-implemented method of claim 11 further comprising:
computing, with a closure diagnostic module, a closure confidence score associated with the auto-resolved fault; and
storing the closure confidence score for access by the auto-resolution procedure.

17. The computer-implemented method of claim 11 further comprising:
instructing closure of the ineligible or non-auto-resolved fault if the ineligible or non-auto-resolved fault has been resolved by the IT resolution group pursuant to the electronic dynamic work instructions packet; and
computing, with a closure diagnostic module, a closure confidence score associated with the ineligible or non-auto-resolved fault.

18. The computer-implemented method of claim 17 further comprising:
evaluating, with the closure diagnostic module, the closure confidence score with respect to a predetermined confidence threshold; and
triggering, with the closure diagnostic module, a review flag if the closure confidence score meets or exceeds the predetermined confidence threshold wherein triggering of the review flag suggests consideration of the ineligible or non-auto-resolved fault for auto-resolution according to the auto-resolution procedure.

19. The computer-implemented method of claim 11 further comprising a packaging module for:
generating a dynamic awareness packet specifying parameters for alerting any one or more contact groups or the IT resolution group about the ineligible or non-auto-resolved fault;
creating an electronic monitoring ticket about the ineligible or non-auto-resolved fault; and
transmitting the electronic monitoring ticket to any one or more contact groups or the IT resolution group utilizing a computer-implemented form of electronic communication.

20. The computer-implemented method of claim 11 further comprising a packaging module for:
generating a dynamic awareness packet specifying parameters for alerting the selected contact group about the ineligible or non-auto-resolved fault;
creating an electronic call ticket about the ineligible or non-auto-resolved fault; and
instructing execution of the call ticket to the selected contact group for resolution utilizing a telephonic form of communication.

21. A non-transitory storage medium comprising computer-executable instructions stored therein for automated resolution and notification of a fault detected for a device monitored by an information technology (IT) fault monitoring server, the computer-executable instructions, when executed by one or more processors, configured to:
receive fault data relating to the fault from the IT fault monitoring server;
analyze the fault data to select a contact group from among a selection of contact groups to contact about the fault;
determine priority of the fault, validity of the fault data, and whether a planned maintenance window associated with the device is present;
instruct auto-closure of the fault for monitoring purposes if the fault data is invalid or that the planned maintenance window is present;
determine eligibility of the fault for assessment by an auto-resolution procedure if the fault data is valid and the planned maintenance window is not present;
instruct generation of an electronic dynamic work instructions packet comprising instructions for resolution of the fault by an IT resolution group if the fault is ineligible for assessment by the auto-resolution procedure;

execute the auto-resolution procedure if the fault is eligible for assessment by the auto-resolution procedure wherein the auto-resolution procedure is automated to generate payload relating to the fault, transmit the payload to an automation platform to investigate the fault, and receive an auto-resolution status of the fault from the automation platform;

instruct closure of the fault if the auto-resolution status indicates that the fault is auto-resolved; and instruct generation of the electronic dynamic work instructions packet if the auto-resolution status indicates that the fault is non-auto-resolved.

\* \* \* \* \*